United States Patent [19]
Nowak et al.

[11] Patent Number: 5,333,008
[45] Date of Patent: Jul. 26, 1994

[54] IMAGING MODULE MOUNTING APPARATUS

[75] Inventors: William J. Nowak, Webster; William J. Cecchi, Rochester, both of N.Y.

[73] Assignee: Xerox Corporation, Stamford, Conn.

[21] Appl. No.: 964,692

[22] Filed: Oct. 22, 1992

[51] Int. Cl.⁵ .................... G01D 15/06; G01D 15/14; F16M 13/00
[52] U.S. Cl. ................ 346/160.1; 346/108; 346/160; 248/562
[58] Field of Search ........ 346/160.1, 108, 160; 248/562

[56] References Cited

U.S. PATENT DOCUMENTS

| | | | |
|---|---|---|---|
| 3,756,687 | 9/1973 | Shin et al. | 350/16 |
| 3,918,806 | 11/1975 | Cook | 355/8 |
| 4,403,877 | 9/1983 | Jones et al. | 400/335 |
| 4,417,260 | 11/1983 | Kawai et al. | 346/160.1 X |
| 5,019,837 | 5/1991 | Schwartz | 346/108 |
| 5,172,277 | 12/1992 | Wahl et al. | 248/562 X |
| 5,247,316 | 9/1993 | Komori et al. | 346/160 |

Primary Examiner—George H. Miller, Jr.

[57] ABSTRACT

An imaging module mounting apparatus is provided to improve dynamic performance without creating an overconstraint condition causing misalignment of the imaging module. Three solid mounts are used to establish and maintain critical location datums of the imaging module. A single or plurality of variably flexible mounts are used, depending on the size of the module, to maintain alignment while minimizing any overconstraint condition caused by the imaging module being distorted out of plane due to thermal distortion and/or static distortion of the mounting frame due to movement of the machine. The variably flexible mount is filled with a high-viscosity silicon polymer. Due to the high-viscosity of the medium, the mount does not respond to fast or high-frequency vibration and appears to be a rigid mount with regard to such movement. The mount will react to very low frequency or static distortion such as that caused by movement of the machine and/or thermal distortion and maintain the imaging module in the proper position to prevent perceptible image defects.

8 Claims, 3 Drawing Sheets

IMAGING MODULE MOUNTING APPARATUS

This invention relates generally to an imaging module mounting apparatus, and more particularly concerns a high viscosity, dynamically stabilizing mount for an imaging module.

In a typical electrophotographic printing process, a photoconductive member is charged to a substantially uniform potential so as to sensitize the surface thereof. The charged portion of the photoconductive member is exposed to selectively dissipate the charges thereon in the irradiated areas. This records an electrostatic latent image on the photoconductive member. After the electrostatic latent image is recorded on the photoconductive member, the latent image is developed by bringing a developer material into contact therewith. Generally, the developer material comprises toner particles adhering triboelectrically to carrier granules. The toner particles are attracted from the carrier granules to the latent image forming a toner powder image on the photoconductive member. The toner powder image is then transferred from the photoconductive member to a copy sheet. The toner particles are heated to permanently affix the powder image to the copy sheet.

In an electrophotographic printing machine of this type, exposure devices, such as a raster output scanner (ROS), e.g. laser beams or a linear transverse array of light emitting diodes, are used to sequentially, line by line, project images onto a moving photoreceptor. The slow scan misplacement of raster lines is a primary cause of banding. Banding is the appearance of striping across an image due to nonuniform spacing of the slow scan raster lines. It has also been determined that a large source of image motion is the slow scan motion of the ROS beam relative to the photoreceptor module, sometimes called "structural image motion". Increasing the number of mounting points between the ROS and the processor frame is one way to increase the effective stiffness of the ROS structure and reduce the structural dynamic response. However, if more than three rigid mounting points are utilized, an overconstraint condition can be created which will distort the ROS frame if all mounting points do not line in plane. This can be particularly evident when a machine is moved and the frame is flexed during the movement of the machine.

In a single pass color printing machine, it is required that four ROS beams superimpose or register to within a fraction of a single raster line. In such a machine, multiple light beams impinge upon a photoconductive surface to record each color portion of an image. The latent image for each color is developed prior to the exposure for the next color portion of the image. In these cases, thermal distortion, as well as dynamic disturbances of the ROS frame relative to the photoreceptor, will cause severe print quality degradation due to misregistration and banding. Accordingly, it is desirable to have a strain-free mounting of the optical subsystem or registration goals will not be achieved. It is desirable therefore to have a mounting member that would act as a solid mount with regard to high-frequency movement, yet would be flexible or allow some flexing between the ROS and the frame for low-frequency movement such as that caused by thermal distortion or movement and stressing of the frame.

The following disclosures may be relevant to various aspects of the present invention:

U.S. Pat. No. 5,019,837, Patentee: Schwarz, Issue Date: May 28, 1991.

U.S. Pat. No. 4,403,877, Patentee: Jones et ano, Issue Date: Sep. 13, 1983.

U.S. Pat. No. 3,918,806, Patentee: Cook, Issue Date: Nov. 11, 1975.

U.S. Pat. No. 3,756,687, Patentee: Shin et ano, Issue Date: Sep. 4, 1973.

The relevant portions of the foregoing disclosures may be briefly summarized as follows:

U.S. Pat. No. 5,019,837 discloses a mirror mounting structure with low thermal drift. The mirror holding arm is connected to a thick, more rigid arm by a resilient, narrow, slightly flexible neck portion thereby allowing the alignment forces to act upon the mirror mount in the same direction and minimize deviations caused by thermal expansion.

U.S. Pat. No. 4,403,877 discloses a flexible force transmitting member biasing arrangement consisting of a snubbing device and a spring. The force transmitting member effectively acts as a damper.

U.S. Pat. No. 3,918,806 discloses an optical scanning system for a photocopier wherein the scanning carriage is mounted on a tubular guide which provides an integral pneumatic dashpot damper therein. A dual carriage system is disclosed which provides damping of a carriage at one speed and also providing damping of the second carriage at a second speed.

U.S. Pat. No. 3,756,687 discloses an image motion compensator for optical systems employing a variable angle fluid medium encapsulated between spaced transparent elements pivotally disposed about mutually perpendicular axes. Damping is non-linear, meaning minimal around the center of precession and increasing exponentially with increase of precession angle.

In accordance with one aspect of the present invention, there is provided a module mounting apparatus. The apparatus comprises a frame and means for rigidly supporting the module to the frame. Means for movably supporting the module to the frame, the movable supporting means being variably flexible in response to different frequency rates of movement between the module and the frame so as to minimize misregistration of an image due to module distortion is also provided.

Pursuant to another aspect of the invention, there is provided an electrophotographic printing machine of the type having an imaging module mounted therein. The improvement comprises a frame and means for rigidly supporting the module to the frame. Means for movably supporting the module to the frame, the movable supporting means being variably flexible in response to different frequency rates of movement between the module and the frame so as to minimize misregistration of an image due to module distortion is also provided.

Other features of the present invention will become apparent as the following description proceeds and upon reference to the drawings, in which.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 3:
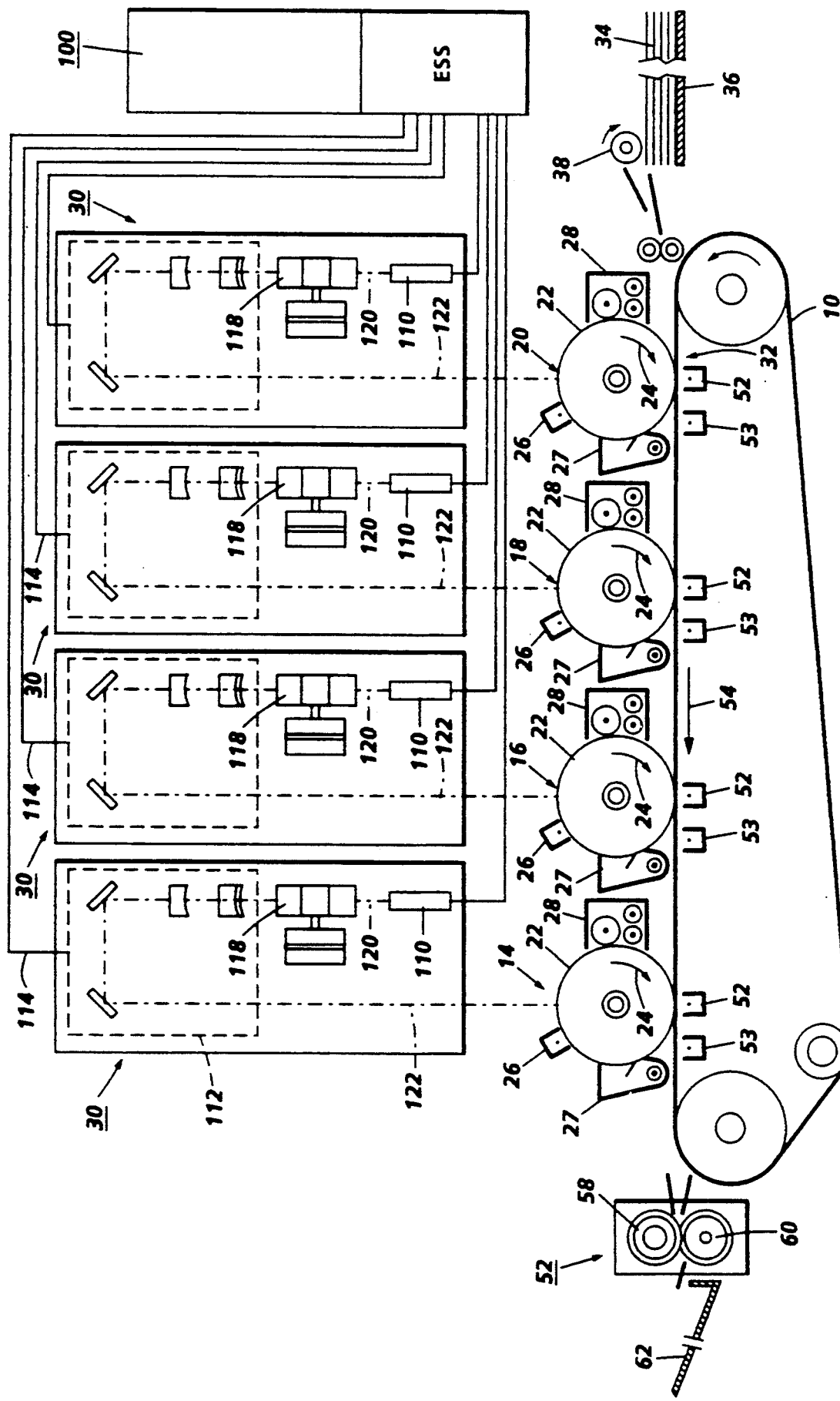
FIG. 3 is a schematic front view of an exemplary full color electrophotographic printing machine incorporating the FIG. 1 imaging module therein.

For a general understanding of the features of the present invention, reference is made to the drawings. In the drawings, like reference numerals have been used throughout to identify identical elements. FIG. 3 schematically depicts a full color electrophotographic printing machine incorporating the features of the present invention therein. It will become evident from the following discussion that the imaging module mounting apparatus of the present invention may be employed in a wide variety of devices and is not specifically limited in its application to the particular embodiment depicted herein.

Referring now to FIG. 3, a substrate carrier belt designated generally by the reference numeral 10 is mounted rotatably on the machine frame. Belt 10 rotates in the direction of arrow 54. Four imaging reproducing stations indicated generally by the reference numerals 14, 16, 18 and 20 are positioned about the periphery of the belt 10. Each image reproducing station is substantially identical to one another. The only distinctions between the image reproducing stations is their position and the color of the developer material employed therein. For example, image reproducing station 14 uses a black developer material, while stations 16, 18 and 20 use yellow, magenta and cyan colored developer material. Inasmuch as stations 14, 16, 18 and 20 are similar, only station 20 will be described in detail.

At station 20, a drum 22 having a photoconductive surface deposited on a conductive substrate rotates in direction of arrow 25. Preferably, the photoconductive surface is made from a selenium alloy with the conductive substrate being made from an electronically grounded aluminum alloy. Other suitable photoconductive surfaces and conductive substrates may also be employed. Drum 22 rotates in the direction of arrow 25 to advance successive portions of the photoconductive surface through the various processing stations disposed about the path of movement thereof.

Initially, a portion of the photoconductive surface of drum 22 passes beneath a corona generating device 26. Corona generating device 26 charges the photoconductive surface of the drum 22 to a relatively high, substantially uniform potential.

Next, the charged portion of the photoconductive surface is advanced through the imaging station. At the imaging station, an imaging module indicated generally by the reference numeral 30, records an electrostatic latent image on the photoconductive surface of the drum 22. Imaging module 30 includes a raster output scanner (ROS). The ROS writes out the electrostatic latent image in a series of horizontal scan lines 46 (FIG. 1) with each line having a specified number of pixels per inch. The present system may also be used in other types of imaging systems employing, for example, a pivoting or shiftable LED write bar or projection LCD (liquid crystal display) or other electro-optic display as the "write" source.

Here, the imaging module 30 (ROS) includes a laser 110 for generating a collimated beam of monochromatic radiation 120, an electronic subsystem (ESS), located in the machine electronic printing controller 100 that transmits a set of signals via 114 corresponding to a series of pixels to the laser 110 and/or modulator 112, a modulator and beam shaping optics unit 112, which modulates the beam 120 in accordance with the image information received from the ESS, and a rotatable polygon 118 having mirror facets for sweep deflecting the beam 122 into raster scan lines 46 (FIG. 1) which sequentially expose the surface of the drum 22 at imaging station 20. An electrostatic latent image is recorded on the photoconductive surface of each drum in succession in the same manner as described above.

Next, a developer unit indicated generally by the reference numeral 28 develops the electrostatic latent image with a cyan colored developer material. Image reproducing stations 14, 16 and 18 use black, yellow and magenta colored developer materials respectively. The latent image attracts toner particles from the carrier granules of the developer material to form a toner powder image on the photoconductive surface of drum 22. After development of the latent image with cyan toner, drum 22 continues to move in direction of arrow 24 to advance the cyan toner image to a transfer zone 32 where the cyan toner image is transferred from drum 22 to the substrate.

At each transfer zone 32, the developed powder image is transferred from photoconductive drum 22 to the substrate. Belt 10 and drum 22 have substantially the same tangential velocity in the transfer zone 32. After the cyan toner image is transferred to the substrate at reproducing station 20, belt 10 advances the cyan toner image to the transfer zone of reproducing station 18 where a magenta toner image is transferred to the substrate is superimposed registration with the cyan toner image previously transferred to the substrate. After the magenta toner image is transferred to the substrate, belt 10 advances the substrate to reproducing station 16 where the yellow toner image is transferred to the substrate in superimposed registration with the previously transferred toner images. Finally, belt 10 advances the substrate to reproducing station 14 where the black toner image is transferred thereto in superimposed registration with the previously transferred toner images to form a multicolor toner image.

At each transfer station, a copy sheet is moved into contact with the toner image on the respective drum 22. The copy sheet is advanced to the transfer stations from a stack of sheets 34 mounted on a tray 36 by a sheet feeder 38. The copy sheet is advanced into contact with the drum 22 at corona generating unit 52 at each transfer station. Corona generating unit 52 sprays ions onto the back side of the sheet to attract the toner image to the front side thereof from drum 22. After the transfer of each color image, the copy sheet passes under a second corona generating unit 53 for detack and continues to move in the direction of arrow 54 until all four images are transferred to the copy sheet. The sheet continues in the direction of arrow 54 to a fusing station which includes a fuser assembly, generally indicated by the reference numeral 56, which permanently affixes the transferred toner image to the copy sheet. Preferably, fuser assembly 56 includes a heated fuser roll 58 and a backup roller 60 with the toner image on the copy sheet contacting fuser roller 58. In this manner, the toner image is permanently affixed to the copy sheet. After fusing, the copy sheets are then fed either to an output tray 62 or to a finishing station, which may include a stapler or binding mechanism.

Referring once again to reproducing station 20, invariably, after the toner image is transferred from drum 22 to the substrate, some residual particles remain adhering thereto. These residual particles are removed from the drum surface 22 at the cleaning station 27. Cleaning station includes a rotatably mounted fibrous or electrostatic brush in contact with the photoconductive surface of drum 22. The particles are cleaned from the drum 22 by rotation of the brush in contact therewith. Subsequent to cleaning, a discharge lamp (not shown) floods the photoconductive surface of drum 22 to dissipate any residual electrostatic charge remaining thereon prior to the charging thereof for the next successive imaging cycle.

It is believed that the foregoing description is sufficient for the purposes of the present application to illustrate the general operation of a multiengine color printing machine.

Figure 1:
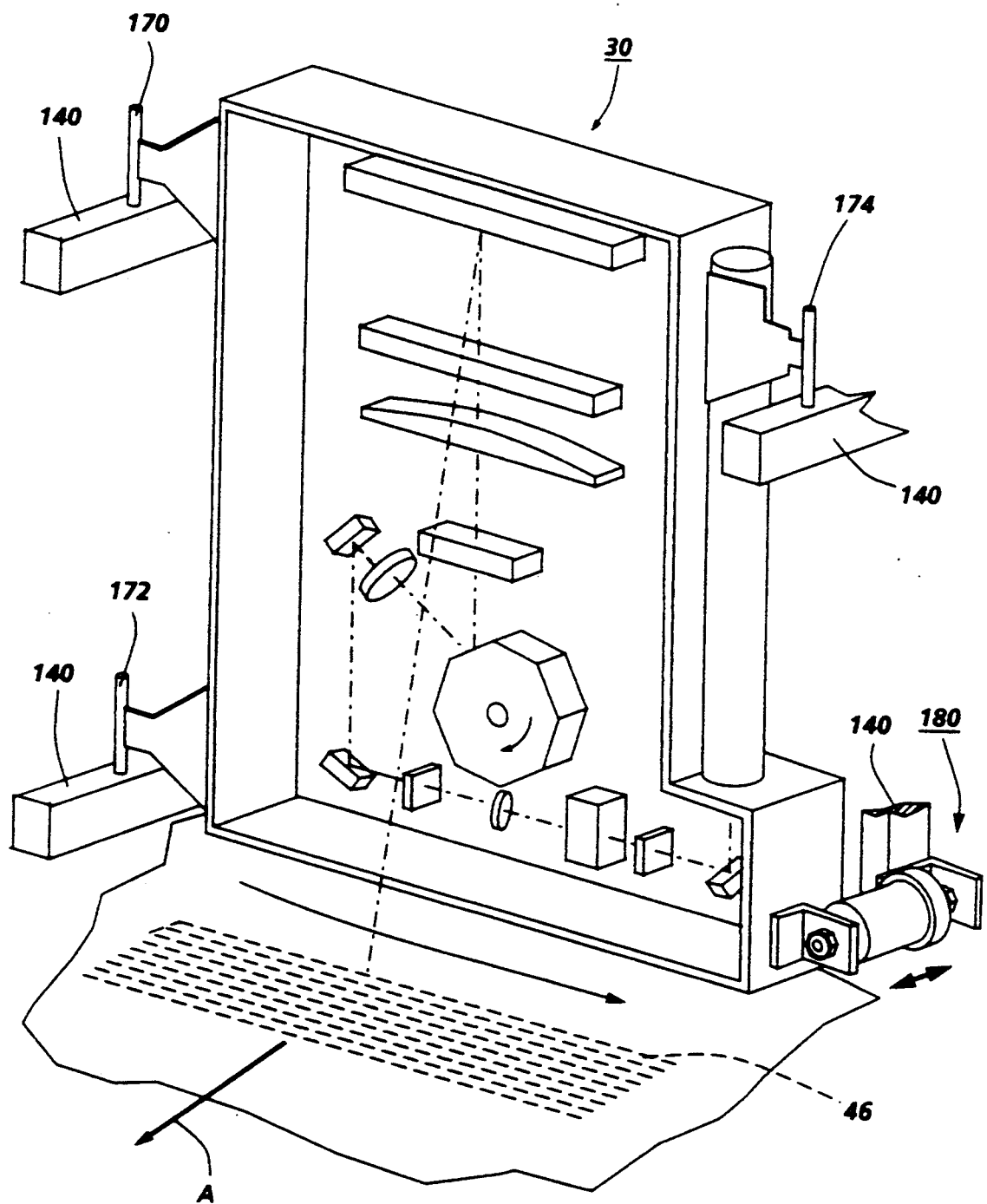
FIG. 1 is a cut away schematic perspective view of the ROS module.

Referring now to FIG. 1, there is illustrated a typical imaging module 30 as mounted in an electrophotographic printing machine. It can be seen that the three rigid mounting points, 170, 172, and 174 are located at three corners of the imaging module 30 and attach the module 30 to the machine frame 140. The rigid mounts 170, 172, 174 establish and maintain the critical location datums for the imaging module 30. These mounts can be bolted members, machine screws, rivets or other fixed fastening devices. The stabilizing mounting apparatus 180 is located at the fourth corner of the imaging module 30. Due to the design of this flexible mount 180 as further detailed in FIG. 2 and described below, the mount acts as a rigid support with respect to high-frequency vibration or other high-frequency motion. However, with respect to low-frequency motion, such as frame twisting due to the movement of the machine or distortion due to thermal changes, the mount 180 flexes or "floats", allowing the imaging module 30 to remain in plane. This "float" thereby minimizes misregistration of the raster lines 46 in the process direction represented by arrow A due to twisting or distortion of the imaging module 30. In some applications, due to imaging module size, it may be desirable to use more than one of the flexible mounts of the invention herein to assure module stability while minimizing distortion of the module.

Ordinarily, a module 30, such as that illustrated in FIG. 1, is mounted in an electrophotographic printing machine utilizing only three rigid mounting points. The three rigid mounts are utilized to establish the critical location datums for the imaging module, while still allowing the module to be unconstrained at the forth point so as to prevent distortion at very low frequency, typically one hertz or less, or what may also be called static distortion. This very low frequency or static distortion is that such as which is caused by different thermal coefficients of expansion of various components of the machine causing a warping of, or relative movement between various portions of the machine or that which may be caused by the machine being moved and the framework of the machine twisted thereby.

Due to the various moving components of a typical electrophotographic printing machine, there is a wide frequency band of vibration or noise created throughout the machine. At different frequencies in different machines, this background noise or vibration may cause the imaging module 30 to vibrate, thereby causing perceptible image distortion in the projected image. As the frequency which can cause a perceptible image distortion can vary depending upon imaging module size and configuration and machine type, an attempt to eliminate the specific frequency vibration causing such distortion is impractical. Adding a fourth, or even a fifth and sixth flexible mounting point if module size so dictates, as described in the present invention, however, does provide the dynamic stability to the imaging module to prevent perceptible image distortion.

As a result of the high viscosity of the flexible mount medium, the flexible mount herein does not react as a traditional dashpot or shock absorber type device, rather, the flexible mount appears to be a rigid mount with respect to the background noise or vibration created within a printing machine, thereby stabilizing the imaging module against perceptible image distortion. It is only with respect to the very low frequency or static distortion as described above to which the flexible mount herein moves or floats. Thus, the vibrational frequency response characteristics of the flexible mount of the present invention and a traditional dashpot are very different. The purpose of the flexible mount herein is to appear as a rigid mount with respect to higher frequency vibration and as a flexible soft mount with respect to very low frequency or static distortion. The traditional object of a dashpot type device, being the damping of vibrational motion, is insufficient to accomplish the purposes of the invention herein.

Figure 2:
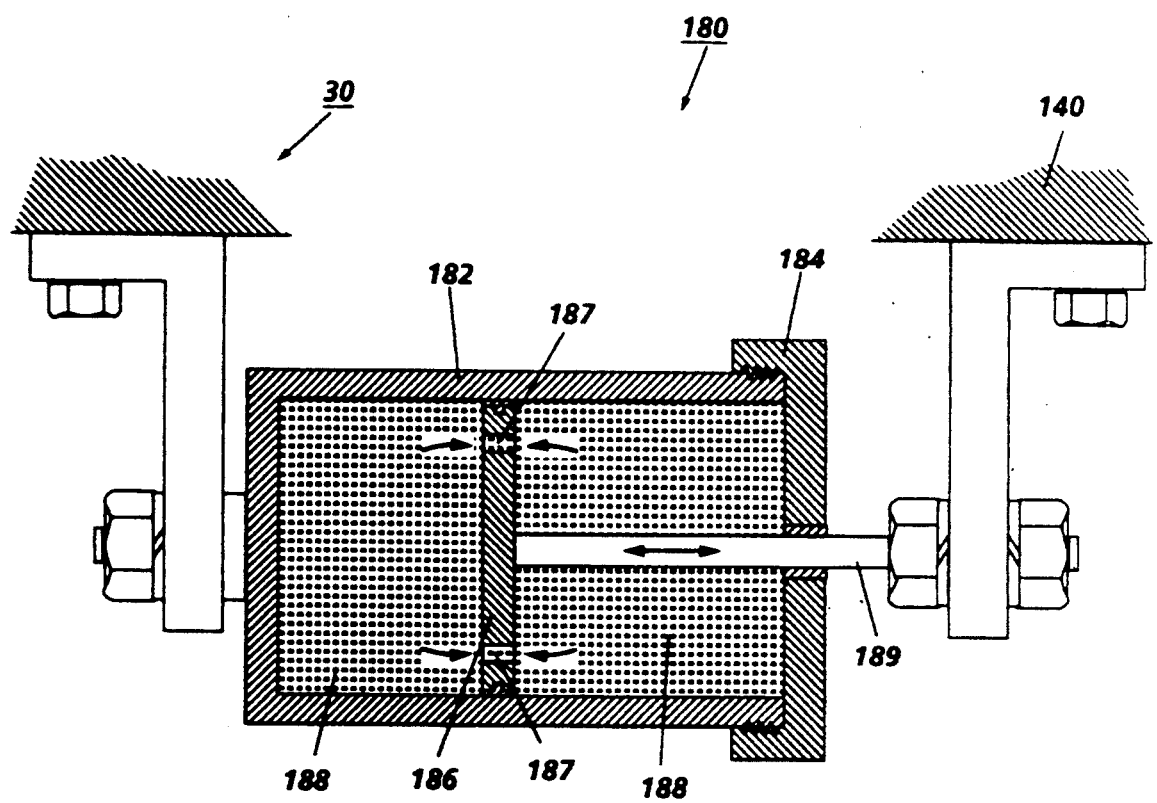
FIG. 2 is a sectional elevational view of one of the supports for the FIG. 1 imaging module incorporating the features of the present invention therein.

Referring now to FIG. 2, it can be seen that the flexible mount 180 consists of a cylindrical tube 182 having a cap 184 and a piston 186 connected to rod 189 located for lateral movement within said tube 182. The tube 182 can be a hollow, open ended tube having threaded ends or as is illustrated, a cylindrical tube having a closed end and an open threaded end. A cap 184, having internal threads, is adapted to be attached to the open end of the tube 182. The cap 184 has a opening for the rod 189 attached to the piston 186 to pass through. The cylindrical tube 182 is filled with a high-viscosity silicon polymer 188 which allows the piston 186 to move laterally within the cylinder 182 and displace the silicon polymer 188 through orifices 187 located in the piston 186. Due to the high-viscosity of the medium 188, however, the piston 186 does not move quickly or respond to fast or high-frequency movement and the mount 180 appears to be rigid with regard to such movement. Additionally, due to the high viscosity of the silicon polymer, only a minimal seal is necessary to prevent leakage through the cap 184 around the rod 189. The piston 186 will be displaced through the high-viscosity medium 188 in response to stresses caused by movement of the machine and/or thermal distortion thereby maintaining the imaging module 30 in the proper position to minimize distortions of the image.

Of course, it will be appreciated by those with knowledge in the art that the above described mounting apparatus can be used not only with full color multiengine electrophotographic printing machines, but also with split beam or multibeam color printing machines, highlight color printing machines and standard black only printing machines. The mounting apparatus minimizes misregistration and banding problems in the machines utilizing multiengine, multibeam or split beam imaging modules and in single beam imaging applications, minimizes the problem of banding due to imaging module distortion. It is obvious that this mounting apparatus can also be utilized to kinematically mount other modules and components such as photoreceptors, large optics modules, etc. or in other non-xerographic systems requiring kinematic mounting of optical or optomechanical compounds and/or systems.

In recapitulation, there is provided an imaging module mounting apparatus which can be used to improve dynamic performance without sacrificing alignment of the imaging module. A number of rigid mounts are used to establish and maintain critical location datums of the imaging module. A single or plurality of flexible mounts which are able to "float" are used to maintain alignment while minimizing any overconstraint condition caused by the imaging module being distorted out of plane due to thermal distortion and/or static distortion of the mounting frame due to movement of the machine.

It is, therefore, apparent that there has been provided in accordance with the present invention, an imaging module mounting apparatus that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. An imaging module mounting apparatus for minimizing distortion of images created by the module, comprising:
    a frame;
    means for rigidly supporting the module to said frame; and
    means for movably supporting the module to said frame, said movable supporting means being variably flexible in response to different frequency rates of movement between the module and said frame so as to minimize misregistration and distortion of an image due to module distortion.

2. An imaging module mounting apparatus for minimizing distortion of images created by the module, comprising:
    a frame;
    means for rigidly supporting the module to said frame, wherein said rigid supporting means comprises at least three rigid elements connecting the module to said frame; and
    means for movably supporting the module to said frame, said movable supporting means being variably flexible in response to different frequency rates of movement between the module and said frame so as to minimize misregistration and distortion of an image due to module distortion.

3. An imaging module mounting apparatus for minimizing distortion of images created by the module, comprising:
    a frame;
    means for rigidly supporting the module to said frame, wherein said rigid supporting means comprises at least three rigid elements connecting the module to said frame; and
    means for movably supporting the module to said frame, wherein said movable supporting means comprises a variably flexible mounting element connecting the module to said frame, said element functioning as a flexible member with regard to low-frequency rates of movement and said element functioning as a fixed member with regard to high-frequency rates of movement so as to minimize misregistration and distortion of an image due to module distortion.

4. The apparatus as described in claim 3, wherein said flexible element comprises:
    a rod;
    a piston with said rod attached thereto, said piston defining an aperture therein;
    a hollow cylindrical tube within which is disposed said piston, said tube having a closed end and an end having an aperture adapted to have said rod extend therethrough; and
    a high-viscosity fluid disposed within said cylinder so as to damp the movement of said piston within said cylinder as said high viscosity fluid is displaced from a first side of said piston to the opposite side of said piston through said apertures.

5. An electrophotographic printing machine of the type having an imaging module mounted therein, wherein the improvement comprises:
    a frame;
    means for rigidly supporting the module to said frame; and
    means for movably supporting the module to said frame, said movable supporting means being variably flexible in response to different frequency rates of movement between the module and said frame so as to minimize misregistration and distortion of an image due to module distortion.

6. An electrophotographic printing machine of the type having an imaging module mounted therein, wherein the improvement comprises:
    a frame;
    means for rigidly supporting the module to said frame, wherein said rigid supporting means comprises at least three rigid elements connecting the imaging module to said frame; and
    means for movably supporting the module to said frame, said movable supporting means being variably flexible in response to different frequency rates of movement between the module and said frame so as to minimize misregistration and distortion of an image due to module distortion.

7. An electrophotographic printing machine of the type having an imaging module mounted therein, wherein the improvement comprises:
    a frame;
    means for rigidly supporting the module to said frame, wherein said rigid supporting means comprises at least three rigid elements connecting the imaging module to said frame; and
    means for movably supporting the module to said frame, wherein said movable supporting means comprises a variably flexible mounting element connecting the imaging module to said frame, said element functioning as a flexible member with regard to low-frequency rates of movement and said element functioning as a fixed member with regard to high-frequency rates of movement so as to minimize misregistration and distortion of an image due to module distortion.

8. The printing machine according to claim 7, wherein said flexible element comprises:
    a rod;
    a piston with said rod attached thereto, said piston defining an aperture therein;
    a hollow cylindrical tube within which is disposed said piston, said tube having a closed end and an end having an aperture adapted to have said rod extend therethrough; and
    a high-viscosity fluid disposed within said cylinder so as to damp the movement of said piston within said cylinder as said high viscosity fluid is displaced from a first side of said piston to the opposite side of said piston through said apertures.

* * * * *